US006996119B2

(12) United States Patent
Koo

(10) Patent No.: US 6,996,119 B2
(45) Date of Patent: Feb. 7, 2006

(54) ADAPTIVE POLLING METHOD FOR ROUTER

(75) Inventor: Joon Mo Koo, Seoul (KR)

(73) Assignee: LG Electronics Inc., Seoul (KR)

( * ) Notice: Subject to any disclaimer, the term of this patent is extended or adjusted under 35 U.S.C. 154(b) by 909 days.

(21) Appl. No.: 09/957,541

(22) Filed: Sep. 21, 2001

(65) Prior Publication Data

US 2002/0039369 A1 Apr. 4, 2002

(30) Foreign Application Priority Data

Sep. 30, 2000 (KR) .............................. 2000-57664

(51) Int. Cl.
*H04L 12/403* (2006.01)

(52) U.S. Cl. ...................................................... 370/449

(58) Field of Classification Search ................ 370/449, 370/453, 445, 457
See application file for complete search history.

(56) References Cited

U.S. PATENT DOCUMENTS 5,623,668 A * 4/1997 Nieuwenhuizen ........... 718/100
6,449,663 B1 * 9/2002 Carney et al. ................ 710/15
6,744,780 B1 * 6/2004 Gu et al. .................... 370/450

* cited by examiner

*Primary Examiner*—Chi Pham
*Assistant Examiner*—Viet Le
(74) *Attorney, Agent, or Firm*—Fleshner & Kim, LLP

(57) ABSTRACT

Disclosed is an adaptive polling method of a router including establishing initial values required for carrying out a polling on ports respectively, polling the respective ports in accordance with the established initial values for an established polling interval time, and re-establishing values required for polling to be carried out properly by considering traffic states of the respective ports. The present invention establishes higher polling on ports having larger traffic volumes and lower polling on ports having smaller traffic volumes, so as to improve the performance of a router.

21 Claims, 4 Drawing Sheets

P=POLLING COUNT
tn=COUNT OF PACKET(S) RECEIVED AT tn

ADAPTIVE POLLING METHOD FOR ROUTER

BACKGROUND OF THE INVENTION

1. Field of the Invention

The present invention relates to a method of controlling a transmission of a router and, more particularly, to a method of controlling the transmission of the router using polling.

2. Background of the Related Art

Generally, a router is an apparatus connecting networks having different lower hierarchy structures. The router transmits packet data (hereinafter abbreviated packet) through an optimal path established in connection with a routing table, as well as connects the received packet to another network or a target node of its own network.

There are two methods for controlling a transmission of a router, these are the interrupt-based method and the polling method. When a packet is received using the interrupt-based method, the corresponding port produces an interrupt signal so as to inform a controller of the packet's arrival. In the polling method, the controller polls the respective ports periodically or successively to make the corresponding port process the received packet.

FIG. 1 illustrates a block diagram of the inner structure of a router used in connection with the polling method. Router 100 connects the corresponding destination or a by-way-of the destination so that packets received through the respective ports 20, 30, 40, and 50 are transferred via the most suitable path. The traffic supported by each of the ports 20, 30, 40, and 50 depends on a line speed and circuit capacity of the connected network.

Controller 10 sends a poll to the respective ports 20, 30, 40, and 50 periodically or successively. The port receiving the poll transmits a received packet to the controller 10. Then, the controller routes the packet to its destination through an optimal path.

Ports 20, 30, 40, and 50 are unable to process the received packet until receiving the poll. When the poll is received from the controller 10, the received packet is transmitted to the controller 10. If an amount of the received packet overflows the capacity of the port, so as not to complete the transmission, the packet continues being received until the next poll is received.

In such a polling method, the controller 10 polls all of the ports successively and fairly, but fails to consider the traffic supported by the respective ports or the transmission speed of the packet. Polling is carried out on ports having high and low traffic volumes without distinction, thereby reducing the system efficiency. Also, the polling method fails to respond to burst traffic properly, thereby reducing the performance of the router. Moreover, the packet may be destroyed if an overflow occurs, due to the abrupt increase of a traffic through a specific port.

SUMMARY OF THE INVENTION

An object of the invention is to solve at least the above problems and/or disadvantages and to provide at least the advantages described hereinafter.

An object of the present invention is to provide an adaptive polling method of a router in which the number of polls allocated to the router ports is based upon the relative traffic load supported by the respective ports.

To achieve these objects and other advantages and in accordance with the purpose of the invention, as embodied and broadly described herein, an adaptive polling method of a router includes establishing initial values required for carrying out a polling on ports respectively, polling the respective ports in accordance with the established initial values for an established polling interval time, and re-establishing values required for polling to be carried out properly by considering traffic states of the respective ports if the polling interval time is over.

In another aspect of the present invention, an adaptive polling method of a router includes establishing initial values required for carrying out a polling on ports respectively, polling the respective ports in accordance with the established initial values for an established polling interval time, finding values of the polling counts of the respective ports and a polling interval time by considering traffic states of the respective ports if the established polling interval time is over, and feeding back to the step of polling the respective ports by allotting the found polling counts to the corresponding ports.

The objects of the present invention may be achieved in whole or in part by an adaptive polling method, including determining a number of times to poll each of a number of ports during each of a plurality of polling intervals, based on a traffic status; polling each of the number of ports during the polling interval in accordance with the number of times to poll; and communicating data with the ports when polled.

The objects of the present invention may be further achieved in whole or in part by an adaptive polling router, including a plurality of ports, each port interconnecting a separate network with the router and communicating data between the router and the respective network; and a controller that polls each of the plurality of data ports a number of times during a polling interval, wherein the plurality of ports communicate the data with the controller when polled, and the number of times that each port is polled during each of a plurality polling intervals is dynamically determined, based on a traffic status of the corresponding port.

The objects of the present invention may be further achieved in whole or in part by an adaptive polling method that includes determining a number of times to poll each of a number of ports during each of a plurality of polling intervals, based on a traffic status; polling each of the ports during each of the polling intervals in accordance with the respective number of times to poll; and communicating data with the ports when polled. The ports supporting greater relative traffic loads are polled more frequently than the ports supporting lesser relative traffic loads. Alternatively, the ports supporting relatively higher priority traffic are polled more frequently than the ports supporting relatively lower priority traffic. Each polling interval is based on a sum of the number of times to poll each of the ports, during the respective polling interval, each of the ports is polled a minimum number of times during the polling intervals, and the minimum number of times each of the ports is polled is independent of a relative traffic load supported by the port and independent of a traffic priority supported by the port. The ports are data ports of a router that each connect a separate communication network to the router to support internetwork communication.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
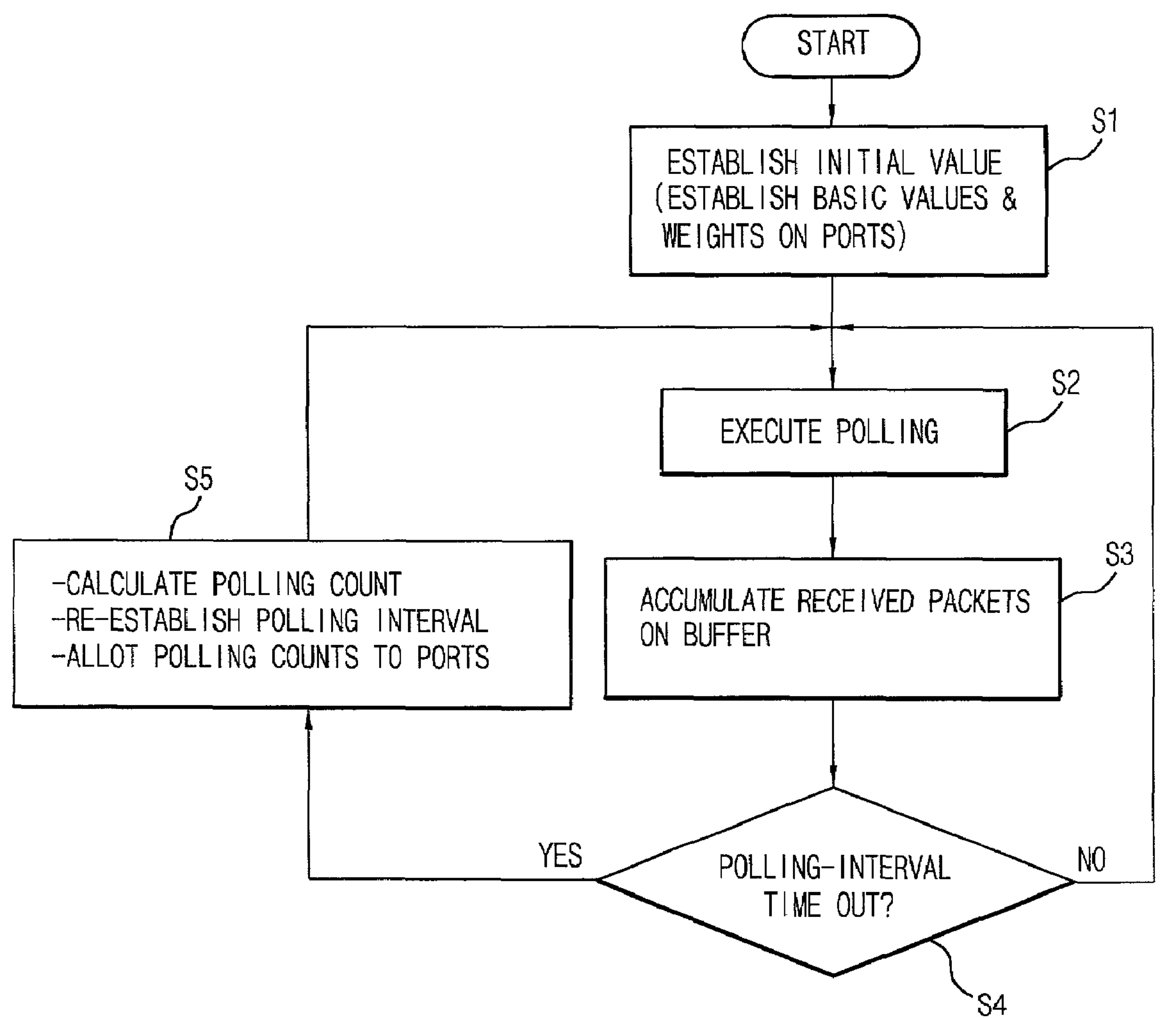
FIG. 2 illustrates a flowchart of an adaptive polling method of a router according to a preferred embodiment of the present invention.

FIG. 2 illustrates a flowchart of an adaptive polling method of a router according to a preferred embodiment of the present invention. The method includes establishing a polling interval time and initial values of a polling count of each port (S1), processing the packets accumulated in the port buffers by polling the respective ports (S2), accumulating the packets received by the respective ports 20, 30, 40, and 50 (S3), checking whether the polling interval time is over (S4), and carrying out steps S2 and S3 again, if the polling interval time is over (S5). Steps S2 and S3 are repeated by re-establishing the polling count of each of the ports and the polling interval time and then allotting the reestablished polling count to the respective ports 20, 30, 40, and 50.

Router 100 establishes a weight of each port, a basic value of each port, and an initial value of a count of packets received by each port. Additionally, the router finds a polling interval time and a polling count of each port using the established values (S1). A statistical experimental value may be established as the initial value, but a user may enable the router to establish the initial value more randomly. In the related art, the polling interval time identifies the time between one polling time and the next polling time. In the present invention, the polling interval time is a time for which the established polling count is applied. Moreover, router 100 may dynamically vary the polling interval in step S5 of each cycle, through the process illustrated in FIG. 2, or invariantly use the initial polling interval in each cycle. When the polling interval is varyingly reestablished in step S5, it is varied in accordance the change in traffic volume for the respective port. When invariantly using the initial polling interval as a fixed value, the total polling counts are normalized so as to be a constant value.

Once the initial value is established, the controller 10 executes the number of polls identified by the polling counts for each of the respective ports, before the polling interval is over (S2). The respective ports receive and accumulate the packets in buffers while the polling is carried out (S3). After completing each polling interval, the controller 10 re-determines the polling counts of the respective ports, allots the corresponding polling counts to the respective ports, and re-establishes the polling interval. Then, steps S2 and S3 are carried out again.

A formula for determining the poling counts of the respective ports using the basic values and weights may be expressed by the equation:

$$\text{polling count of } n^{th} \text{ port} = \text{weight of } n^{th} \text{ port} * \text{count of packet(s) accumulated on } n^{th} \text{ port} + \text{basic value of } n^{th} \text{ port} \quad (1)$$

The weight and basic value are established differently in each of the ports, in accordance with the traffic. Initially, experimental statistical values are allotted to the weight and basic value. Alternatively, a user may establish arbitrary values for the weight and basic value. The controller 10 adjusts the polling interval time or the polling counts of the respective ports 20, 30, 40, and 50 by changing the weights and basic values. The weights are determined by the importance of the respective ports and a maximum speed of the received packets. Additionally, the weights are assigned to give the ports having larger traffic volumes greater priority, so their accumulated packets may be processed more expeditiously. The basic values are established by considering the port having the least traffic and are used to ensure that each port has at least one poll within a maximum delay time. If the poll is not given to the specific port within the maximum delay time, the packets received by the port may be lost due to burst traffic.

If a length of the polling interval becomes too long, overhead becomes smaller so as to be vulnerable to burst traffic. If the length of the polling interval becomes too short, there exist so many operations that the overhead becomes larger. The maximum delay time is the maximum polling interval that may be used without a loss of packets due to burst traffic.

Figure 1:
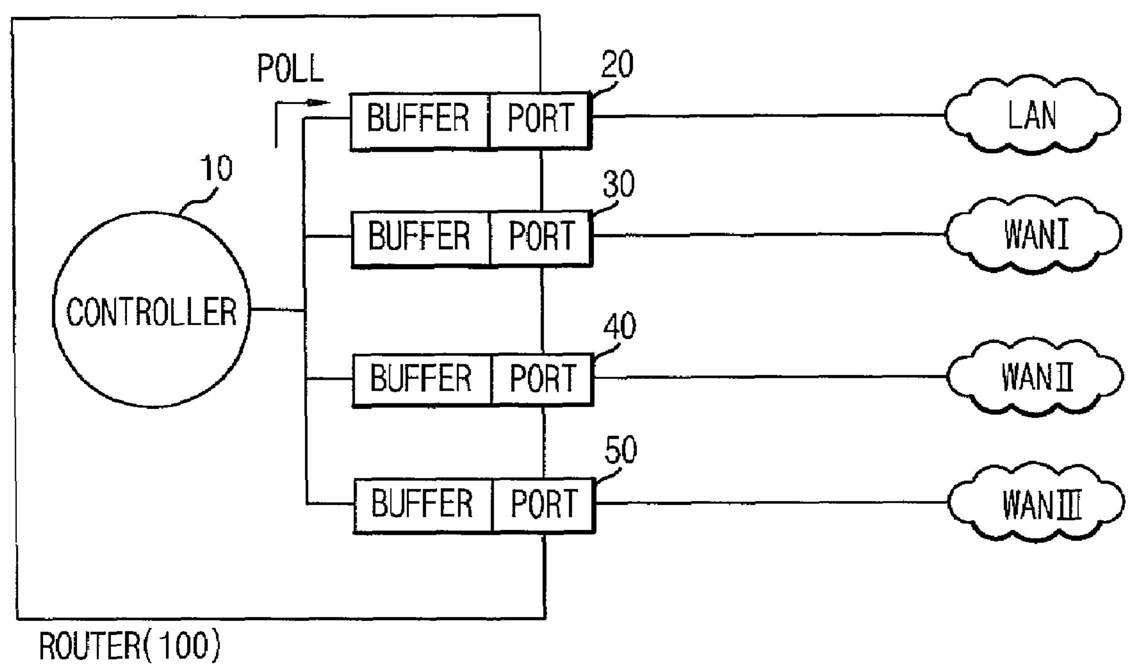
FIG. 1 illustrates a block diagram of an inner structure of a router used in connection with the polling method.
Figure 3:
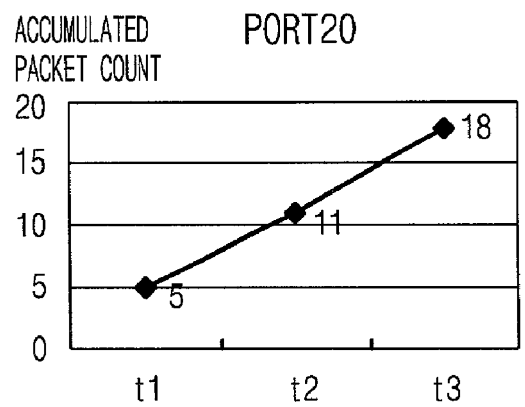
FIG. 3 illustrates graphs that show a count of packets received by the corresponding ports of FIG. 1.
Figure 3:
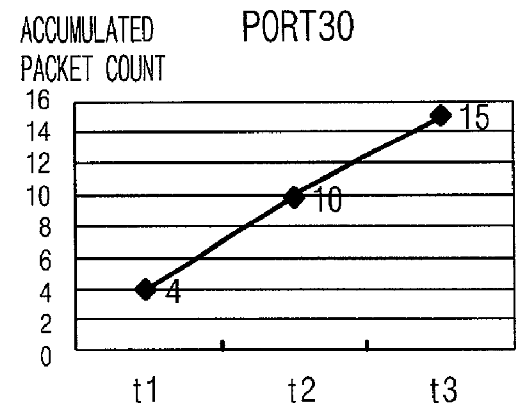
Figure 3:
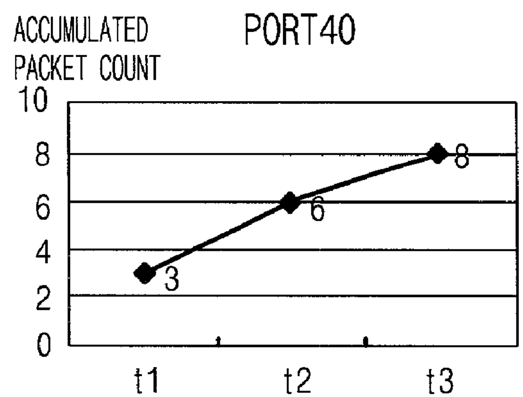
Figure 3:
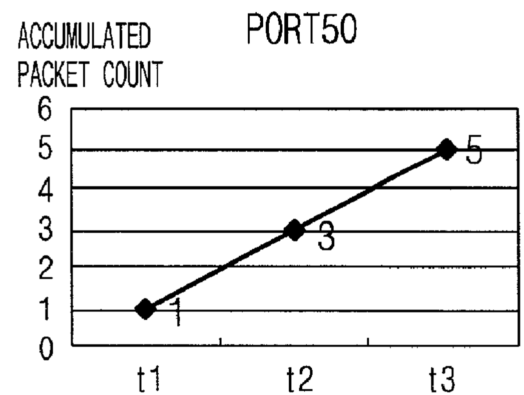

FIG. 3 illustrates graphs that show a count of packets received by the corresponding ports of FIG. 1. Packet counts $t_n$ received by ports 20, 30, 40, and 50 at time t1 are 5, 4, 3, and 1, respectively. Packet counts $t_n$ received by ports 20, 30, 40, and 50 between times t1 and t2 are 6, 6, 3, and 2, respectively. And packet counts $t_n$ received by ports 20, 30, 40, and 50 between times t2 and t3 are 7, 5, 2, and 2, respectively.

Figure 4A:
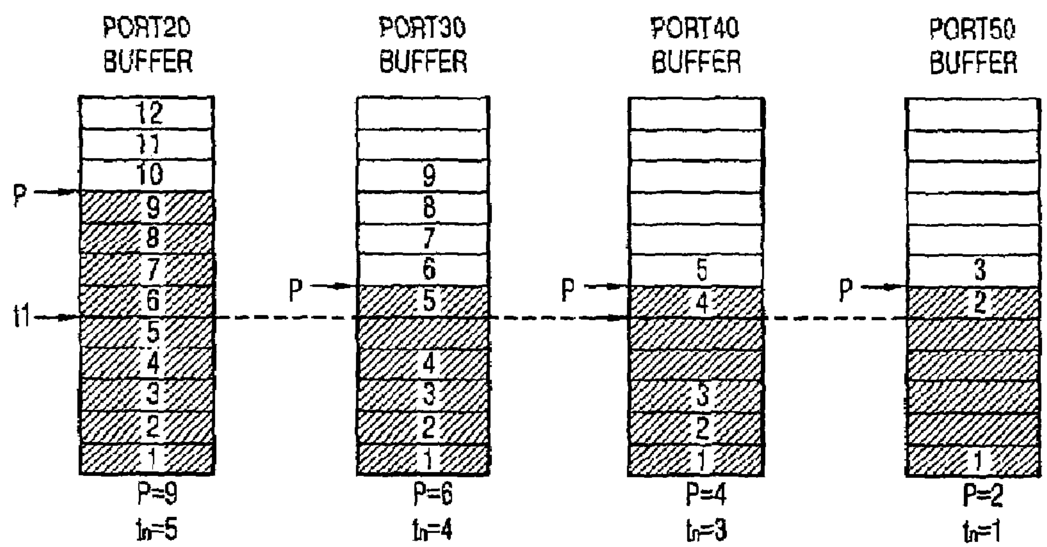
FIG. 4A illustrates the number of packets stored in buffers of the respective ports of FIG. 1 at time t1.
Figure 4B:
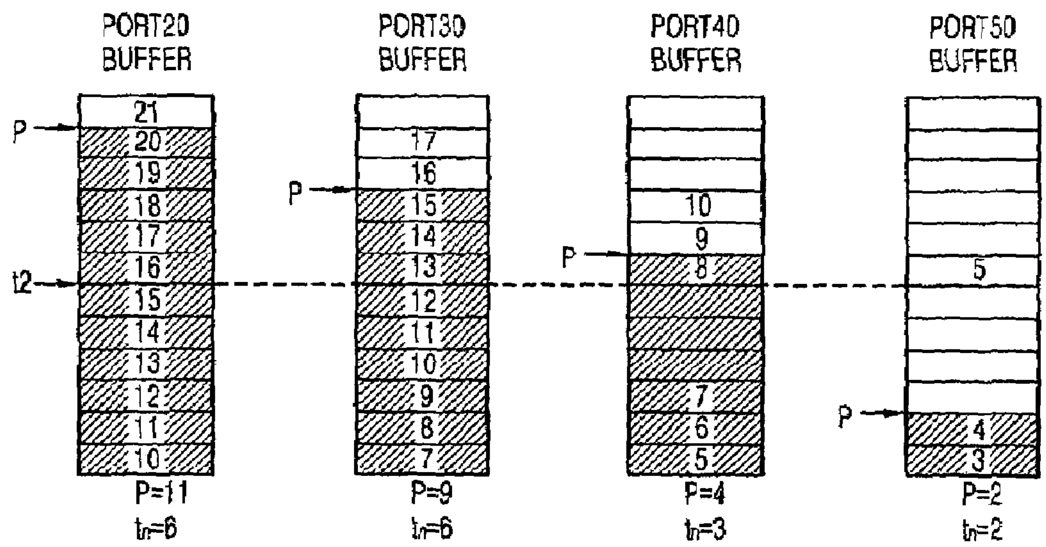
FIG. 4B illustrates the number of packets stored in buffers of the respective ports of FIG. 1 at time t2.

FIG. 4A illustrates the number of packets stored in buffers of the respective ports of FIG. 1 at time t1 and FIG. 4B illustrates the number of packets stored in buffers of the respective ports at time t2. These figures show the number of packets stored in the respective ports during sequential time periods, the time points $t_n$ identifying the sequential time periods, and the number of packets processed during the polling interval time.

An exemplary use of the adaptive polling method is explained below. Controller 10 initially establishes the weights $W_n$ of the ports as $W_{20}=1.7$, $W_{30}=1.2$, $W_{40}=1.0$, and $W_{50}=0.0$ and the basic values $I_n$ as $I_{20}=0$, $I_{30}=0$, $I_{40}=1$, and $I_{50}=2$. These weights $W_n$ and basic values $I_n$ are merely exemplary and were selected to simplify the description of the preferred embodiment.

A polling count $P_n$ of each port is found by substituting the values for the weight $W_n$, basic value $I_n$, and count of the packets received at time t1 for their respective variables in equation (1). Decimals values are rounded up to the nearest ones digit.

$$P_{20}=5*1.7+0=9$$

$$P_{30}=4*1.2+0=5$$

$$P_{40}=3*1.0+1=4$$

$$P_{50}=1*0+2=2$$

A polling interval time T at time t1 is found by adding all of the polling counts, as expressed by the equation:

$$T=9+5+4+2=20$$

The controller 10 allots the calculated polling counts $P_{20}$, $P_{30}$, $P_{40}$, and $P_{50}$ to the respective ports. Namely, 9, 5, 4, and 2 polls are given to ports 20, 30, 40, 50, respectively. For each poll, the controller 10 gives the respective buffer an opportunity to transmit the packets stored in the buffer.

After the 20 polls are finished (i.e., the polling interval time T is ended), the controller 10 calculates the polling counts $P_n$, again, and re-establishes the revised polling interval T at time t2. A user may shorten or lengthen the polling interval time T by revising the weights $W_n$ or basic values $I_n$. The user may optimize the weights $W_n$ and basic values $I_n$ to prevent too many operations from occurring and to prevent the loss of packets due to traffic bursts.

Another polling count $P_n$ of each port is found at time $t_2$, as follows.

$$P_{20}=6*1.7+0=11$$

$$P_{30}=6*1.2+0=8$$

$$P_{40}=3*1.0+1=4$$

$$P_{50}=2*0+2=2$$

The polling interval time T at time t2 is 25.

Controller 10 allots the calculated polling counts $P_{20}$, $P_{30}$, $P_{40}$, and $P_{50}$ to the respective ports. Namely, 11, 8, 4, and 2 polls are given to ports 20, 30, 40, 50, respectively. For each poll, the controller 10 gives the respective buffer an opportunity to transmit the packets stored in the buffer.

After the 25 polls are finished, the controller 10 calculates the polling counts $P_n$ at time t3 and re-establishes the polling interval time T. This process continues for every sequential interval of time T.

As explained in the above description, each of the router ports may have periods of large and small traffic volume and high and low data transfer rates, which is a traffic characteristic in general data transmission. Considering such a traffic characteristic, the present invention establishes high weights on ports or time zones having large traffic volumes and low weights on ports or time zones having small traffic volumes so as to improve the performance of a router. Moreover, the polling method provided by the invention enables it to be applied to network systems having a plurality of ports.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An adaptive polling method, comprising:

establishing initial values required for polling on ports respectively;

polling the respective ports in accordance with the established initial values for an established polling interval time; and re-establishing values required for polling based on traffic states of the respective ports, wherein re-establishing values required for polling further comprises:

determining polling counts of the respective ports; and determining the polling interval time by summing all of the polling counts of the respective ports.

2. The method of claim 1, wherein a controller receives data packets from the respective port being polled.

3. The method of claim 1, wherein the polling and re-establishing steps are repeated.

4. The method of claim 1, wherein re-establishing values required for polling further comprises:

allocating the polling counts to the corresponding ports.

5. The method of claim 4, wherein each of the polling counts of the respective ports is determined by an equation expressed as follows: the polling count of an $n^{th}$ port=a weight of the $n^{th}$ port*a count of packets accumulated on the $n_{th}$ port+a basic value of the nth port.

6. The method of claim 5, wherein the weight and the basic value of the $n^{th}$ port are established by a user.

7. The method of claim 5, wherein the weight of the $n^{th}$ port is determined by considering the importance or traffic of the corresponding port.

8. The method of claim 5, wherein the basic value of the $n^{th}$ port establishes a minimum polling count for the corresponding port during the polling interval time.

9. The method of claim 5, wherein the counts of the packets accumulated on the respective ports ate numbers of packets received by the respective ports during the polling interval time.

10. The method of claim 5, wherein the weight of the $n^{th}$ port varies in accordance with traffic of the corresponding port

11. The method of claim 1, wherein the polling interval time is determined anew when the values required for polling are re-established.

12. An adaptive polling method, comprising:

(a) establishing initial values required for polling on ports respectively and assigning the initial values to respective current values;

(b) polling the respective ports in accordance with the established initial current values for an established polling interval time;

(c) determining polling counts of the respective ports and the polling interval time based on traffic states of the respective ports;

(d) allocating the polling counts to the corresponding ports as the current values; and (e) repeating the processes of paragraphs (b), (c), and (d) a number of times.

13. The method of claim 12, wherein a controller receives data packets from the respective port being polled.

14. The method of claim 12, wherein each of the polling counts of the respective ports is determined by an equation expressed as follows: the polling count of an $n^{th}$ port=a weight of the $n^{th}$ port*a count of packets accumulated on the $n^{th}$ port+a basic value of the $n^{th}$ port.

15. The method of claim 14, wherein the weight and the basic value of the $n^{th}$ port are established by a user.

16. The method of claim 14, wherein the weight of the nth port is determined by considering the importance or traffic of the corresponding port.

17. The method of claim 14, wherein the basic value of the $n^{th}$ port establishes a minimum polling count for the corresponding port during the polling interval time.

18. The method of claim 14, wherein the counts of the packets accumulated on the respective ports ate numbers of packets received by the respective ports during the polling interval time.

19. The method of claim 14, wherein the weight of the $n^{th}$ port varies in accordance with traffic of the corresponding port.

20. The method of claim 12, wherein the polling interval time is determined anew when the values required for polling are re-established.

21. The method of claim 1, wherein:

the traffic states of the respective ports is at least one of a data rate, an available data capacity, a communication load, a burst data rate, a communication priority, an information entropy, and a communication type, and the communication type is at least one of a voice communication, a still image communication, a motion picture video, a music communication, a data file communication, an electronic mail communication, and a data terminal communication.

* * * * *